US007799252B2

(12) United States Patent
Liu et al.

(10) Patent No.: US 7,799,252 B2
(45) Date of Patent: Sep. 21, 2010

(54) METHOD FOR MAKING A THERMAL INTERFACE MATERIAL HAVING CARBON NANOTUBE ARRAY

(75) Inventors: Chang-Hong Liu, Bei-Jing (CN); Hong-Jiang Li, Bei-Jing (CN); Shou-Shan Fan, Bei-Jing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 356 days.

(21) Appl. No.: 12/006,315

(22) Filed: Dec. 29, 2007

(65) Prior Publication Data

US 2009/0117279 A1    May 7, 2009

(30) Foreign Application Priority Data

Nov. 2, 2007    (CN)    .................... 2007 1 0124249

(51) Int. Cl.
  B29C 67/00    (2006.01)
  B29C 41/14    (2006.01)
(52) U.S. Cl. .................. 264/102; 264/134; 264/139; 264/250
(58) Field of Classification Search ............... None
  See application file for complete search history.

(56) References Cited

U.S. PATENT DOCUMENTS

| 7,297,399 | B2* | 11/2007 | Zhang et al. | 428/339 |
| 7,535,715 | B2* | 5/2009 | Chung | 361/707 |
| 2004/0209782 | A1* | 10/2004 | Zhang et al. | 508/113 |
| 2005/0269726 | A1* | 12/2005 | Matabayas | 264/104 |
| 2006/0231970 | A1* | 10/2006 | Huang et al. | 264/134 |
| 2008/0160866 | A1* | 7/2008 | Zhang et al. | 445/24 |

* cited by examiner

*Primary Examiner*—Edmund H. Lee
(74) *Attorney, Agent, or Firm*—Clifford O. Chi

(57) ABSTRACT

A method for making a thermal interface material includes: providing a CNT array on a substrate; providing a first solution with organic matter and ferric ion; soaking the CNT array into the first solution for a period of time; dipping a second solution into the first solution to form a ferric salt deposit; taking out the CNT array, and then heating the CNT array in inert gas; and cooling and peeling off the CNT array from the substrate, and finally achieving a thermal interface material. The thermal interface material made by the present method has a high heat conducting efficiency.

18 Claims, 2 Drawing Sheets

METHOD FOR MAKING A THERMAL INTERFACE MATERIAL HAVING CARBON NANOTUBE ARRAY

BACKGROUND

1. Field of the Invention

The invention relates to methods for making thermal interface materials and, particularly, to a method for making a thermal interface material having carbon nanotube array.

2. Discussion of Related Art

Many electronic components such as semiconductor chips are becoming progressively smaller with each new product release, while at the same time the heat dissipation requirements of these kinds of components are increasing due to their improved ability to provide more functionality. Commonly, a thermal interface material is utilized between an electronic component and a heat sink in order to fill air spaces therebetween and thereby promote efficient heat transfer.

Carbon nanotubes (CNTs) produced by means of arc discharge between graphite rods were first discovered and reported in an article by Sumio Iijima, entitled "Helical Microtubules of Graphitic Carbon" (Nature, Vol. 354, Nov. 7, 1991, pp. 56-58). An another article authored by Savas Berber, entitled "Unusually High Thermal Conductivity of Carbon Nanotubes" (page 4613, Vol. 84, Physical Review Letters 2000) discloses that a heat conduction coefficient of a carbon nanotube can be 6600 W/mK (watts/milliKelvin) at room temperature. That tends to make CNTs ideal candidates for thermal interface material.

A method for making the thermal interface material having CNT array is by diffusing particles with a high heat conduction coefficient therein. The particles can be made of graphite, boron nitride, silicon oxide, alumina, silver, or other metals. However, the diffusing particles can not be uniformly dispersed into the CNT array, because of the interspaces therein is small, and interfaces between some diffusing particles and CNTs in the CNT array is high. Therefore, heat conduction coefficient of the thermal interface material is low and cannot adequately meet the heat dissipation requirements of modern electronic components.

Another method for making the thermal interface material having CNT array is by injection molding. In this method, the CNT array is filled with a polymer material. However, the thermal interface material formed by injection molding is relatively thick. This increases a bulk of the thermal interface material, reduces its flexibility. Furthermore, because of filled with the polymer material, the heat conducting efficiency of thermal interface material is low.

Therefore, a simple method for making a thermal interface material is desired, which is thin, flexible and has a high heat conducting efficiency.

SUMMARY

A method for making a thermal interface material includes: providing a CNT array on a substrate; providing a first solution with organic matter and ferric ion; soaking the CNT array into the first solution for a period of time; dipping a second solution into the first solution to form a ferric salt deposit; taking out the CNT array, and then heating the CNT array in inert gas; and cooling and peeling off the CNT array from the substrate, and finally achieving a thermal interface material.

Compared with the conventional method for making thermal interface material, the present method has the following advantages: firstly, a CNT array with graphite particles filled therein is flexible, the thermal interface material can adequately contact with the heat source and the heat spreader, and thus the heat resistance between the thermal interface material and heat source/heat spreader is reduced; secondly, the CNT array and the graphite particles are both composed of carbon, and the heat resistance between the interfaces therebetween is low; thirdly, the concentration of the CNTs in the CNT array is high, and more heat conduction paths between the heat source and the heat spreader are formed. In summary, the heat conducting efficiency of the thermal interface material is improved. Further, the thermal interface material is thin, and thus can be applied in a small-sized device.

Other advantages and novel features of the present method will become more apparent from the following detailed description of preferred embodiments when taken in conjunction with the accompanying drawings.

BRIEF DESCRIPTION OF THE DRAWINGS

Many aspects of the present method can be better understood with reference to the following drawings. The components in the drawings are not necessarily to scale, the emphasis instead being placed upon clearly illustrating the principles of the present method.

Figure 1:
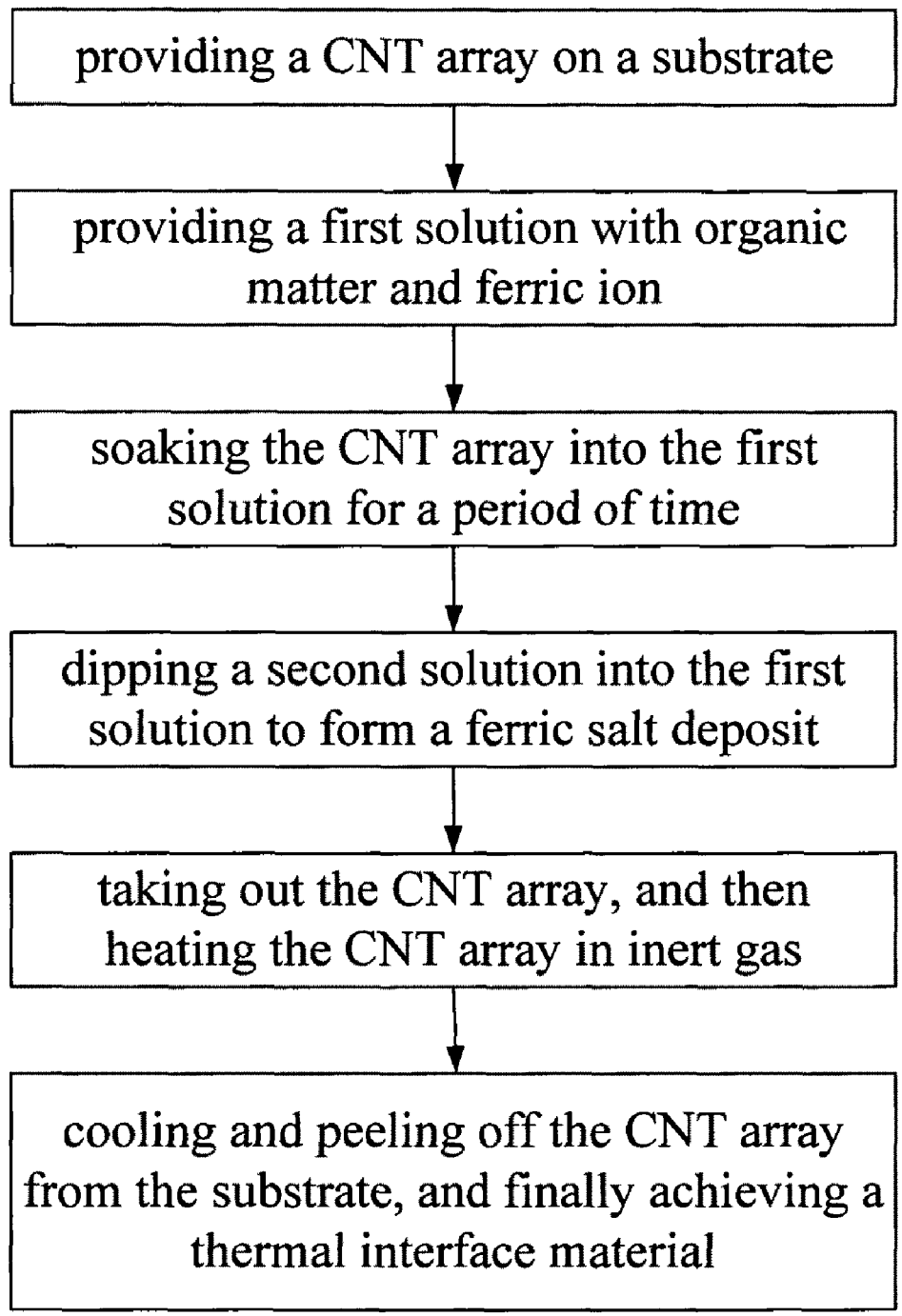
FIG. 1 is a schematic, flow chart showing the present method for making a thermal interface material.

Corresponding reference characters indicate corresponding parts throughout the several views. The exemplifications set out herein illustrate at least one preferred embodiment of the present method for a thermal interface material, in one form, and such exemplifications are not to be construed as limiting the scope of the invention in any manner.

DETAILED DESCRIPTION OF PREFERRED EMBODIMENTS

Reference will now be made to the drawings to describe the preferred embodiments of the present method, in detail.

Referring to FIG. 1, a method for making a thermal interface material is illustrated as the following steps:

Step 1, providing a CNT array on a substrate;

Step 2, providing a first solution with organic matter and ferric ion;

Step 3, soaking the CNT array into the first solution for a period of time;

Step 4, dipping a second solution into the first solution to form a ferric salt deposit;

Step 5, taking out the CNT array, and then heating the CNT array in inert gas; and Step 6, cooling and peeling off the CNT array from the substrate, and finally achieving a thermal interface material.

In step 1, the CNT array is a super-aligned CNT array, which is grown using a chemical vapor deposition method. The method is described in U.S. Pat. No. 7,045,108, which is incorporated herein by reference. Firstly, a substrate is provided, and the substrate is a substrate of p type silicon or n type silicon. Secondly, a catalyst layer is deposited on the substrate. The catalyst layer is made of a material selected from a group consisting of iron (Fe), cobalt (Co), nickel (Ni), and their alloys. Thirdly, the substrate with the catalyst layer is annealed at a temperature in an approximate range from 300 to 400 degrees centigrade under a protecting gas for about 10 hours. Fourthly, the substrate with the catalyst layer is heated to approximately 500 to 700 degrees centigrade and a mixed gas including a carbon containing gas and a protecting gas is introduced for about 5 to 30 minutes to grow a super-aligned CNTs array. The carbon containing gas can be a hydrocarbon gas, such as acetylene or ethane. The protecting gas can be an inert gas. The grown CNTs are aligned parallel in columns and held together by van der Waals force interactions. The CNTs array has a high density and each one of the CNTs has an essentially uniform diameter.

In step 2, the organic matter is nonvolatile or not easily volatile, such as glucose, amylum, and cellulose. The ferric ion is consisted in a soluble ferric salt, such as ferric nitrate and ferric chloride. A method for making the first solution includes the following step: providing a mixture with organic matter and soluble ferric salt in a mass ratio of 15:1 to 30:1; solving the mixture into a de-ionized water, and then stirring at room temperature for a while; and finally achieving the first solution with a concentration of the organic matter in 20% to 40%. The first solution is limpid.

In step 3, the CNT array is soaked into the first solution for 1 to 12 hours, so that the first solution can be more completely filled into the interspaces between the CNTs. Then the organic matter is absorbed on the surfaces of the CNTs by van der Waals force interactions.

Further, before step 3, the CNT array can be placed into a vacuum for a while, so than the gas in the interspaces between the CNTs is removed. Thus, the first solution can be further filled into the interspaces therebetween.

In step 4, the second solution reacts with the ferric ion in the first solution and then a salt deposit is formed. The second solution is a material selected from a group consisting of sodium sulfide, potassium sulfide, sodium carbonate and potassium carbonate. In the present embodiment, the second solution is sodium sulfide solution, and the deposit achieved is ferric sulfide.

In step 5, the heating process includes: firstly placing the CNT array into a chamber, wherein the chamber is at 20-200° C. and filled with at least one inert gas; secondly, increasing the temperature of the chamber at a rate of 5° C. per minute, until 300-500° C.; thirdly, holding the temperature for about 0.5-1.5 hours. In the present embodiment, the CNT array is placed a chamber at 100° C., heated up to 400° C. in a period of 1 hour, and held at the temperature for one hour.

In the heating process, with the ferric sulfide as a catalyzer, the organic matter is transformed into graphite particles. The CNT array filled with a number of graphite particles and some ferric salt deposits is formed.

Figure 2:
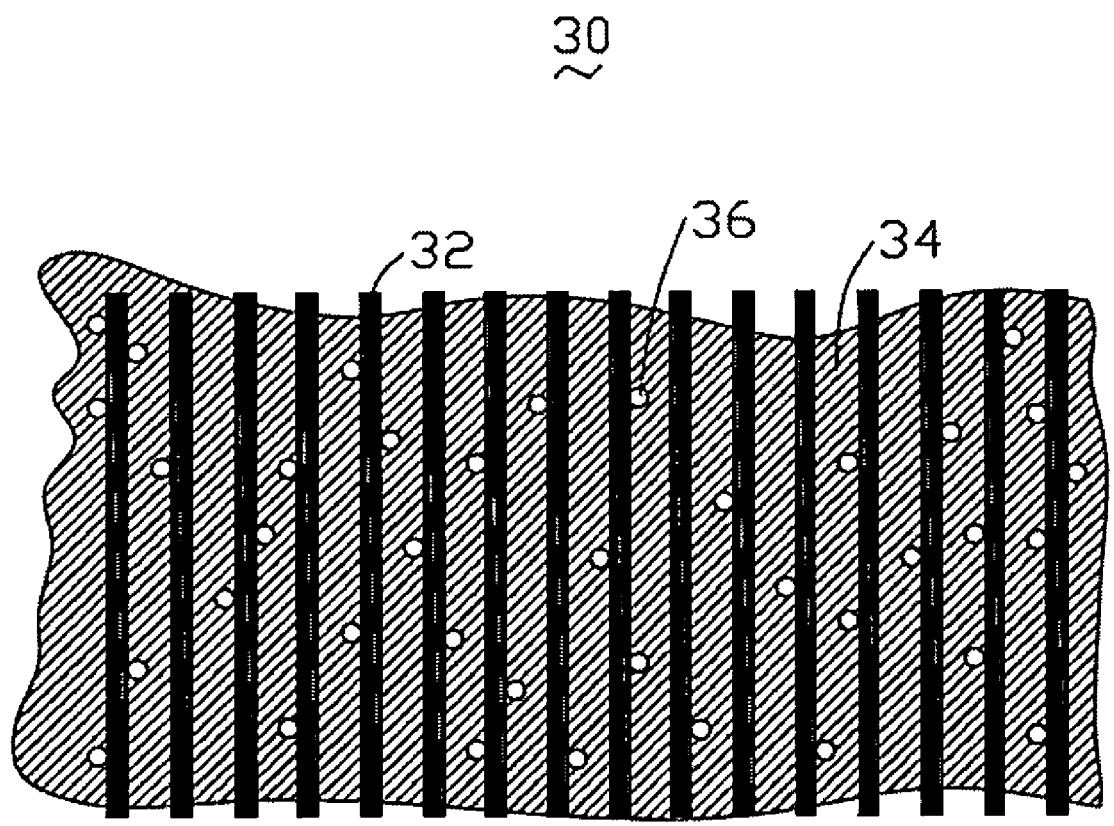
FIG. 2 is a schematic, cross-section view of the thermal interface material made by the present method.

In step 6, the CNT array is peeled off from the substrate, and a thermal interface material is achieved. Referring to FIG. 2, the thermal interface material 30 is shown. The graphite particles 34 are uniformly dispersed in the interspaces of the CNT array 32, and the ferric salt deposits 36 are dispersed in the graphite particles 34. Thermal interface material 30 has a thickness of about 10-1000 microns.

In practical application, the thermal interface material is generally sandwiched between the heat source and a heat spreader, the CNT array and graphite particles can provide multiple heat conduction paths therebetween. Further, the CNT array and the graphite particles are both composed of carbon, the heat resistance between the interfaces therebetween is low and a heat conducting efficiency of the thermal interface material is improved.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A method for making a thermal interface material comprising:
   providing a CNT array on a substrate;
   providing a first solution with organic matter and ferric ion;
   soaking the CNT array into the first solution for a period of time;
   dipping a second solution into the first solution having the carbon nanotube array disposed therein to form a ferric salt deposit;
   taking out the CNT array from the first solution after the second solution is dipped thereinto, and then heating the CNT array in inert gas; and
   cooling and peeling off the CNT array from the substrate after the CNT array is heated in the inert gas, and finally achieving a thermal interface material.

2. The method for making a thermal interface material as claimed in claim 1, wherein the CNT array is a super-aligned CNT array.

3. The method for making a thermal interface material as claimed in claim 1, wherein the organic matter is nonvolatile and soluble.

4. The method for making a thermal interface material as claimed in claim 3, wherein the organic matter is a material selected from the group consisting of glucose, amylum, and cellulose.

5. The method for making a thermal interface material as claimed in claim 1, wherein the ferric ion is consisted in a soluble ferric salt.

6. The method for making a thermal interface material as claimed in claim 5, wherein the soluble ferric salt is a material selected from the group consisting of ferric nitrate and ferric chloride.

7. The method for making a thermal interface material as claimed in claim 5, wherein a mass ratio of the organic matter to the soluble ferric salt is approximately from 15:1 to 30:1.

8. The method for making a thermal interface material as claimed in claim 1, wherein a concentration of the organic matter in the first solution is approximately from 20% to 40%.

9. The method for making a thermal interface material as claimed in claim 1, wherein the CNT array is soaked into the first solution for about 1-12 hours.

10. The method for making a thermal interface material as claimed in claim 1, wherein before soaked into the first solution, the CNT array is placed into a vacuum to remove the gas in the CNT array.

11. The method for making a thermal interface material as claimed in claim 1, wherein the second solution is a material selected from the group consisting of sodium sulfide, potassium sulfide, sodium carbonate and potassium carbonate.

12. The method for making a thermal interface material as claimed in claim 1, wherein the second solution is sodium sulfide solution, and the ferric salt deposit is ferric sulfide.

13. The method for making a thermal interface material as claimed in claim 1, wherein the heating process comprises: placing the CNT array into a chamber at about 20-200° C. and filled with at least one inert gas; increasing the temperature of the chamber at a rate of about 5° C. per minute, approximately until 300-500° C.; holding the temperature for about 0.5-1.5 hours.

14. The method for making a thermal interface material as claimed in claim 1, wherein the thermal interface material comprises the CNT array, a plurality of graphite particles uniformly filled in the interspaces of the CNT array, and the ferric salt deposits in the interspaces of the CNT array.

15. The method for making a thermal interface material as claimed in claim 1, wherein the thermal interface material has a thickness ranged from about 10 microns to about 1000 microns.

16. The method for making a thermal interface material as claimed in claim 1, wherein a method for making the first solution comprises:
provides a mixture of organic matter and soluble ferric salt in a mass ratio of 15:1 to 30:1; and
dissolving the mixture into a de-ionized water, and then stirring the mixture and the de-ionized water.

17. The method for making a thermal interface material as claimed in claim 1, wherein the organic matter is transformed into a plurality of graphite particles during heating the CNT array in inert gas with ferric sulfide as a catalyzer.

18. The method for making a thermal interface material as claimed in claim 17, wherein the plurality of graphite particles is uniformly dispersed in the interspaces of the CNT array and the ferric salt deposit is dispersed in the graphite particles.

* * * * *